United States Patent
Jo et al.

(10) Patent No.: US 10,870,422 B2
(45) Date of Patent: Dec. 22, 2020

(54) METHOD AND APPARATUS FOR DETECTING FAIL OF ELECTRONIC PARKING BRAKE

(71) Applicant: HYUNDAI MOBIS CO., LTD., Seoul (KR)

(72) Inventors: Chi Hoon Jo, Gwangmyeong-si (KR); Min Kyu Jung, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 193 days.

(21) Appl. No.: 16/107,588

(22) Filed: Aug. 21, 2018

(65) Prior Publication Data

US 2019/0135259 A1    May 9, 2019

(30) Foreign Application Priority Data

Nov. 9, 2017    (KR) .......................... 10-2017-0148436

(51) Int. Cl.
  *B60T 17/22*    (2006.01)
  *B60T 7/08*    (2006.01)

(52) U.S. Cl.
  CPC ............ *B60T 17/221* (2013.01); *B60T 7/085* (2013.01); *B60T 2270/406* (2013.01)

(58) Field of Classification Search
  CPC ... B60T 8/44; B60T 8/90; B60T 8/885; B60T 8/4081; B60T 8/4884; B60T 17/18;
  (Continued)

(56) References Cited

U.S. PATENT DOCUMENTS 6,774,595 B1 *  8/2004  Laxhuber ................ B60T 13/74
                                                          303/20
9,346,449 B1 *  5/2016  Chang ...................... H02P 7/00
(Continued)

FOREIGN PATENT DOCUMENTS

KR    20-1999-0027137 U    7/1999
KR    10-2013-0067170 A    6/2013
(Continued)

OTHER PUBLICATIONS

Office Action of corresponding Korean Patent Application No. 10-2017-0148436—8 pages (dated Dec. 20, 2018).

*Primary Examiner* — Robert A. Siconolfi
*Assistant Examiner* — San M Aung
(74) *Attorney, Agent, or Firm* — Knobbe Martens Olson & Bear LLP

(57) ABSTRACT

A method for detecting a fail of an electronic parking brake may include: detecting, by an electronic control unit (ECU), a current applied to a motor during a parking operation of an eDIH parking brake, and detecting a current inflection point at which the slope of the current is changed, the slope of the current having started to rise in a load generation section following a no-load section after a starting current of the motor was generated; and comparing, by the ECU, the current value of the detected current inflection point to a current value of a preset reference current inflection point, and recognizing that a fail occurred during the parking operation of the eDIH parking brake, when the current value of the detected current inflection point is different by a preset error range or more from the current value of the reference current inflection point.

10 Claims, 6 Drawing Sheets

(58) Field of Classification Search
CPC ............ B60T 17/221; B60T 2270/402; B60T 2270/414; B60L 3/10; B60L 2200/26
USPC ... 303/122, 122.04, 124, 142, 152, 161, 162
See application file for complete search history.

(56) References Cited

U.S. PATENT DOCUMENTS

| | | | | |
|---|---|---|---|---|
| 2002/0066626 A1* | 6/2002 | Gill | ................ | B60T 7/107 |
| | | | | 188/158 |
| 2004/0201270 A1* | 10/2004 | Suzuki | ................ | B60T 13/741 |
| | | | | 303/20 |
| 2005/0035653 A1* | 2/2005 | Godlewsky | ............... | B60T 8/00 |
| | | | | 303/122.03 |
| 2013/0261917 A1* | 10/2013 | Kotake | ................ | F16D 65/183 |
| | | | | 701/70 |
| 2015/0369317 A1* | 12/2015 | Choe | ................ | F16D 66/00 |
| | | | | 701/70 |
| 2016/0214595 A1* | 7/2016 | Baehrle-Miller | ......... | B60T 7/22 |

FOREIGN PATENT DOCUMENTS

KR     10-2014-0026035 A     3/2014
KR     10-2015-0145553 A     12/2015

\* cited by examiner

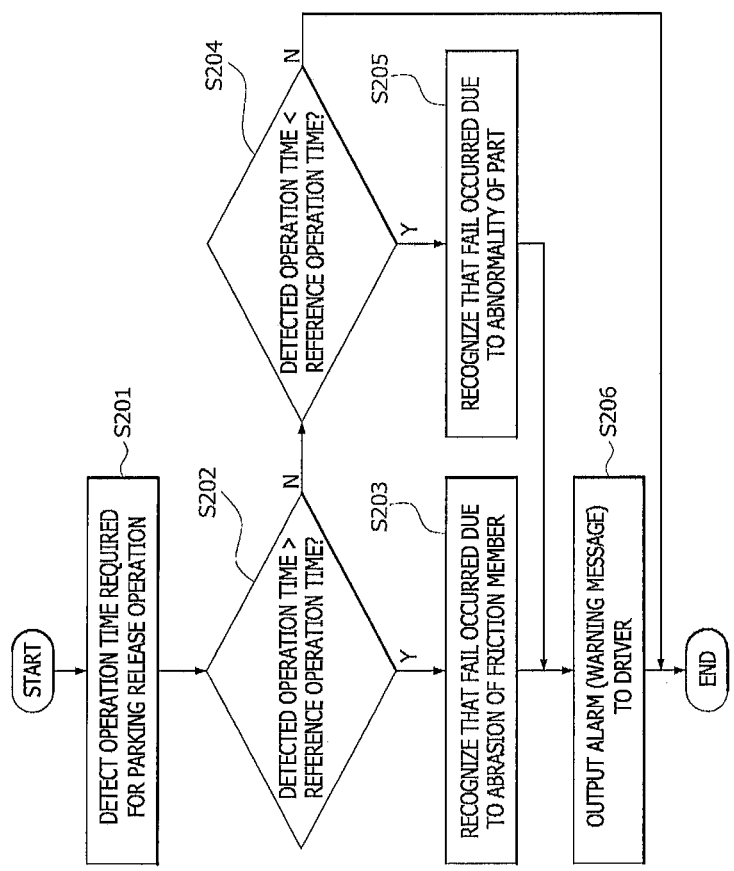

METHOD AND APPARATUS FOR DETECTING FAIL OF ELECTRONIC PARKING BRAKE

CROSS-REFERENCES TO RELATED APPLICATIONS

The present application claims priority to Korean application number 10-2017-0148436, filed on Nov. 9, 2017, which is incorporated by reference in its entirety.

BACKGROUND OF THE INVENTION

The present invention relates to a method and apparatus for detecting a fail of an electronic parking brake, and more particularly, to a method and apparatus for detecting a fail of an electronic parking brake, which can sense a shift of an inflection point and current value of a motor by a spring when a mechanical problem occurred, for example, when the spring in a piston was damaged or lost its elasticity due to an overload or durability of an eDIH (electronic Drum In Hat) parking brake, recognize the shift as a fail, and output a warning.

In general, a brake system of a vehicle is used to not only decelerate and stop the vehicle, but also maintain a parking state. The brake system is divided into a foot brake used for decelerating and stopping the vehicle and a parking brake used for parking the vehicle.

The foot brake is divided into a disk brake and a drum brake, depending on its structure. Recently, many vehicles employ the disk brake used for their rear wheels, instead of the drum brake. Therefore, the parking brake with a drum structure is installed separately from the disk brake. For this structure, a DIH (Drum In Hat) parking brake is used.

The eDIH parking brake is a typically known electronic parking brake (EPB), and the EPB is generally divided into a MoC (Motor on Caliper) brake and the eDIH parking brake, depending on its operation method.

The DIH parking brake indicates a parking brake with a drum structure, and the eDIH parking brake employs an electronic control motor structure instead of an existing mechanical motor structure operated by a cable. The DIH parking brake is usually applied to a truck or bus which requires a large braking force because the truck or bus has a large weight and load capacity.

FIG. 1 illustrates a schematic structure of an eDIH parking brake according to the related art. The eDIH parking brake boosts power generated by an actuator (or motor) through a gear, and transfers the boosted power to a worm gear through a worm shaft. The worm gear rotates a bolt screw, moves a piston connected to a nut through rotation-linear motion conversion of a bolt and nut, and expands a shoe of the eDIH, thereby generating a parking force.

In other words, in the eDIH parking brake system, rotations of the electromechanical actuator (or motor) are transferred through the worm shaft and a worm wheel, and the bolt screw rotated by the worm wheel is compressed by the nut part in the piston, and transfers a load to a spring mounted in the piston. Then, the spring pressurizes the piston to expand the shoe, thereby generating an operating force.

In the eDIH parking brake system, the parking force is generated by friction between the disk and the shoe while the shoe is rotated. At this time, a gap may be formed between the piston and the shoe by the rotation of the shoe, and cause a load drop to drop the load of the piston. In this case, a load corresponding to the compressed spring (not illustrated) in the piston is regenerated to compensate for the load drop when a torque is generated.

At this time, however, a mechanical problem may occur due to an overload and durability of the eDIH parking brake. For example, the spring in the piston may be damaged or lose its elasticity.

The related art of the present invention has been disclosed in Korean Patent Publication No. 10-2013-0067170 published on Jun. 21, 2013 and entitled "Control method of electronic parking brake".

SUMMARY OF THE INVENTION

Embodiments of the present invention are directed to a method and apparatus for detecting a fail of an electronic parking brake, which can sense a shift of an inflection point and current value of a motor by a spring when a mechanical problem occurred, for example, when the spring in a piston was damaged or lost its elasticity due to an overload or durability of an eDIH parking brake, recognize the shift as a fail, and output a warning.

In one embodiment, a method for detecting a fail of an electronic parking brake may include: detecting, by an electronic control unit (ECU), a current applied to a motor during a parking operation of an electronic DIH (Drum In Hat) parking brake, and detecting a current inflection point at which the slope of the current is changed, the slope of the current having started to rise in a load generation section following a no-load section after a starting current of the motor was generated; and comparing, by the ECU, the current value of the detected current inflection point to a current value of a preset reference current inflection point, and recognizing that a fail occurred during the parking operation of the eDIH parking brake, when the current value of the detected current inflection point is different by a preset error range or more from the current value of the reference current inflection point.

When the current value of the detected current inflection point is smaller than the current value of the reference current inflection point, the ECU may recognize that a fail occurred during the parking operation of the eDIH parking brake.

The current value of the reference current inflection point may be a current value when a current value of an actuator, generated during the parking operation of the eDIH parking brake corresponds to a compressive force of a spring.

The method may further include: detecting, by the ECU, a time to reach the detected current inflection point; comparing the time to reach the detected current inflection point to a preset time to reach the reference current inflection point; and recognizing that a fail occurred during the operation of the eDIH parking brake, when the time to reach the current inflection point is different by a preset error range or more from the time to reach reference current inflection point.

The time to reach the current inflection point may indicate a time to reach the current inflection time at which the slope of the current is changed, the slope of the current having started to rise from the start point of the load generation section following the no-load section after the starting current of the motor was generated.

When the time to reach the current inflection point is shorter than the reference time to reach the current inflection point, the ECU may recognize that a fail occurred during the parking operation of the eDIH parking brake.

In another embodiment, a method for detecting a fail of an electronic parking brake may include: detecting, by an ECU, an operation time required for releasing an operation condition of an eDIH parking brake; and recognizing, by the ECU, that a fail occurred in the eDIH parking brake due to abrasion of a friction member, when the detected operation time is increased to a larger value than the a preset reference time.

The method may further include outputting, by the ECU, an alarm or warning message to a driver terminal in response to the increased operation time, the alarm or warning message informing a driver that gap adjustment between the lining and a disk is required because a lining of the eDIH parking brake is worn, after recognizing that the fail occurred.

The method may further include recognizing that a fail occurred in the eDIH parking brake due to an error in parts of the brake other than abrasion of the friction member, when the detected operation time is decreased to a smaller value than the preset reference time.

The method may further include outputting, by the ECU, an alarm or warning message to a driver terminal in response to the decreased operation time, the alarm or warning message informing the driver that an abnormality occurred in the parts of the eDIH parking brake, after recognizing that the fail occurred.

The operation time may indicate the time at which a current applied to a motor starts to rise toward a preset target current value.

The operation time required for releasing the parking operation of the eDIH parking brake may correspond to a time obtained by adding sections a and b of sections a, b and c, wherein the section a is where a motor of the eDIH parking brake is driven in the reverse direction to release a pressurizing force, the section b is where the motor is rotated with no load until a piston of the eDIH parking brake reaches a torque plate after the pressurizing force is released, and the section c is where the spring is recompressed after the piston reaches the torque plate, and the current rises to reach the reference current value.

In another embodiment, there is provided an apparatus for detecting a fail of an electronic parking brake, including an ECU configured to detect a current applied to a motor during a parking operation of an eDIH parking brake, and detect a current inflection point at which the slope of the current is changed, the slope of the current having started to rise in a load generation section following a no-load section after a starting current of the motor was generated. The ECU may compare the current value of the detected current inflection point to a current value of a preset reference current inflection point, and recognize that a fail occurred during the parking operation of the eDIH parking brake, when the current value of the detected current inflection point is different by a preset error range or more from the current value of the reference current inflection point.

BRIEF DESCRIPTION OF THE DRAWINGS

FIG. 5 is a flowchart for describing a method for detecting a fail during the parking release operation of the eDIH parking brake in accordance with the present embodiment.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
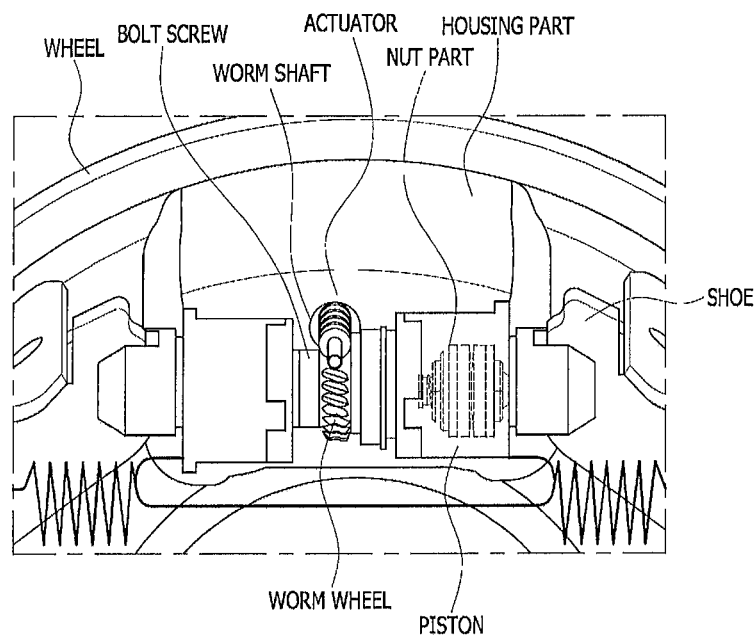
FIG. 1 illustrates a schematic structure of an eDIH parking brake according to the related art.
Figure 2A:
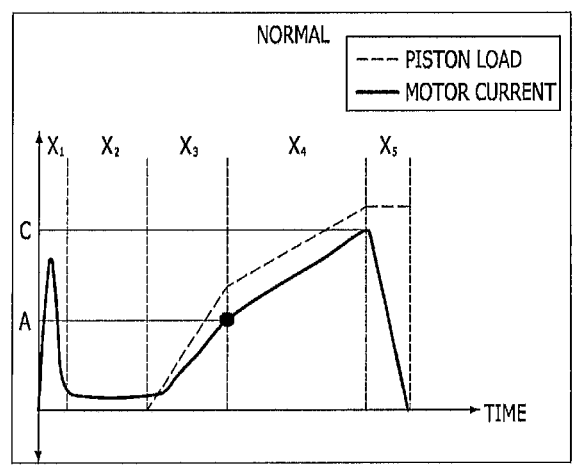
FIGS. 2A and 2B are graphs comparatively illustrating current changes when an eDIH parking brake in accordance with an embodiment of the present invention is normally operated and when the eDIH parking brake has a fail, during a parking operation.
Figure 2B:
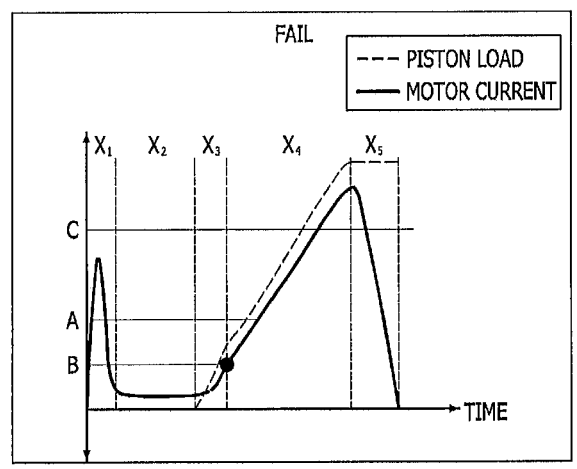

FIGS. 2A and 2B are graphs comparatively illustrating current changes when an eDIH parking brake in accordance with an embodiment of the present invention is normally operated and when the eDIH parking brake has a fail, during a parking operation.

Referring to FIG. 2A, when a parking signal is inputted to the eDIH parking brake in accordance with the present embodiment from an electronic control unit (ECU, not illustrated), an actuator (or motor) may be driven to generate a starting current (section $X_1$ of FIG. 2A), and the motor may be rotated with no load in a section $X_2$ corresponding to a gap between a shoe and disk.

Then, in a load generation section $X_3$, a piston load may be increased with a stiffness slope equal to or less than the compressive load of a spring in the piston. The stiffness slope may indicate a slope in an elastic deformation region, and the elastic deformation region may indicate a deformation region which returns to the original shape when a force is controlled. When the current reaches a point A at which the piston load corresponds to the compressive force of the spring, the compression of the spring is started, and the piston load is increased with a slope corresponding to spring stiffness. At this time, a change in stiffness of the spring changes the slope of the current, and a current inflection point is formed at the point A.

Then, when the current reaches a current value (point C) corresponding to a target load value (target piston load value), the ECU (not illustrated) may turn off the motor such that the eDIH parking brake is locked by an operation between a bolt screw and nut. Then, the piston load is maintained to perform parking.

However, when the elasticity of the spring is decreased or lost by an overload applied to the spring in the piston or a reduction in endurance of the spring during the parking operation of the eDIH parking brake, the compressive force of the spring may be reduced. In this case, when a load is generated as illustrated in FIG. 2B, the current corresponding to the compressive force of the spring may be reduced from A to B, while the load generation section $X_3$ is shortened. Then, in a piston load increase section (or spring compression section) $X_4$, a load may be generated by system stiffness due to a reduction or loss in elasticity of the spring, and the current generation slope may rapidly increase.

When such a phenomenon occurs (that is, the current generation slope rapidly increases), the compressive force of the spring may be reduced to cause a load drop when a torque is generated. At this time, only a load corresponding to the reduction in compressive force of the spring may be generated, or the load generation may disappear not to generate a target braking torque. In this case, the vehicle cannot perform a parking operation.

As illustrated in FIG. 2B, the current value of the actuator (motor) during the parking operation may be generated as a lower current value than the point A at which the current value corresponds to the compressive force of the spring, and the inflection point and slope of the current may be changed by a specific ratio or more in comparison to the preset inflection point and slope of the current. In this case, the ECU (not illustrated) may sense the change or a change of the current applied to the motor, recognize that the eDIH parking brake system has a fail, and raise the operation force (current value (point C) corresponding to the target piston load value) to a higher value by a predetermined ratio or more than the point C (predetermined current value), such that the parking torque can be maintained. Furthermore, the ECU may turn on a warning light (not illustrated).

Figure 3:
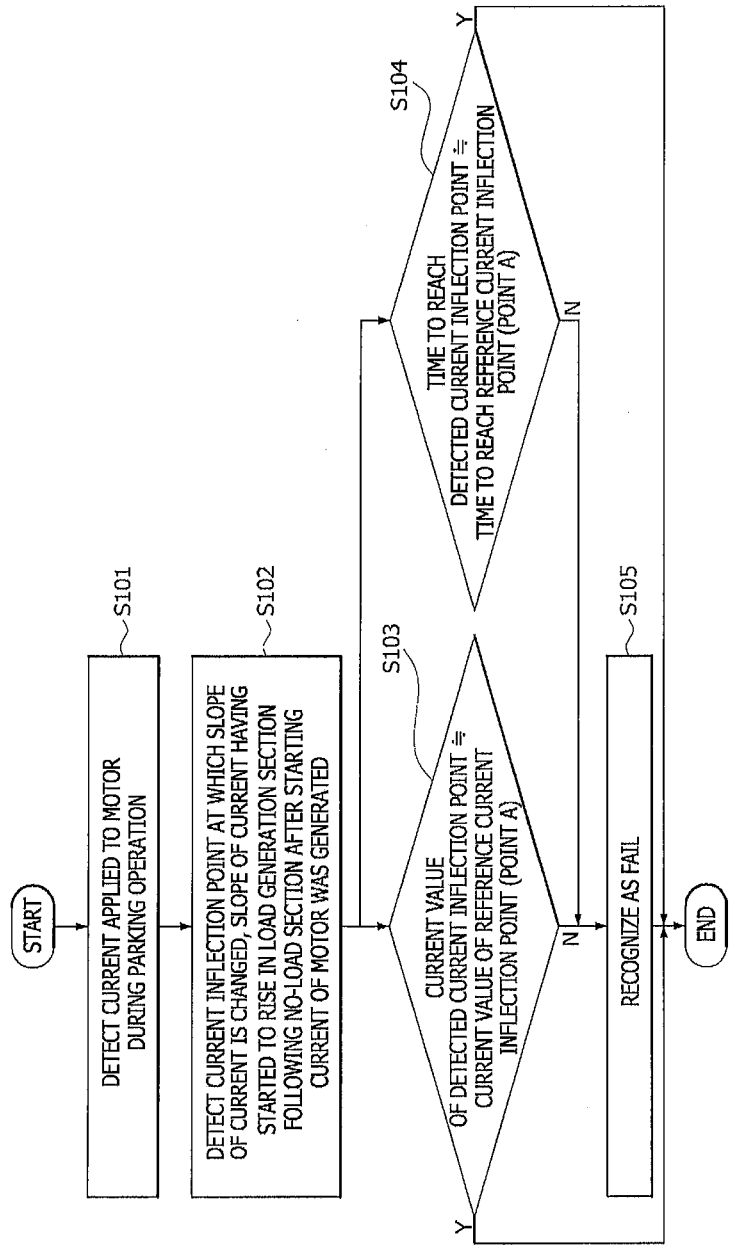
FIG. 3 is a flowchart for describing a method for detecting a fail during the parking operation of the eDIH parking brake in accordance with the present embodiment.

FIG. 3 is a flowchart for describing a method for detecting a fail during a parking operation of the eDIH parking brake in accordance with the present embodiment.

As illustrated in FIG. 3, the ECU (not illustrated) may detect a current generated during a parking operation of the eDIH parking brake system or a current applied to the motor at step S101, and detect an inflection point of the detected current at step S102. At the inflection point, the slope of the current may be changed, which has started to rise in the load generation section following the no-load section after the starting current of the motor was generated.

When the current value of the detected current inflection point is different by a preset error range or more from the current value of the reference current inflection point corresponding to the point A of FIG. 2 (No at step S103), for example, when the current value of the detected current inflection point is smaller than the current value of the reference current inflection point or the current value of the actuator (motor) which is generated during the parking operation and corresponds to the compressive force of the spring, the ECU may recognize that a fail occurred during the operation of the eDIH parking brake, at step S105.

Furthermore, when the time to reach the detected current inflection point (the time of the load generation section $X_3$ in FIG. 2) is different by a preset error range or more from the time to reach the reference current inflection point (the point A of FIG. 2), for example, when the time to reach the detected current inflection point becomes shorter than the time to reach the reference current inflection point (No at step S104), the ECU may recognize that a fail occurred during the operation of the eDIH parking brake system, at step S105.

Figure 4:
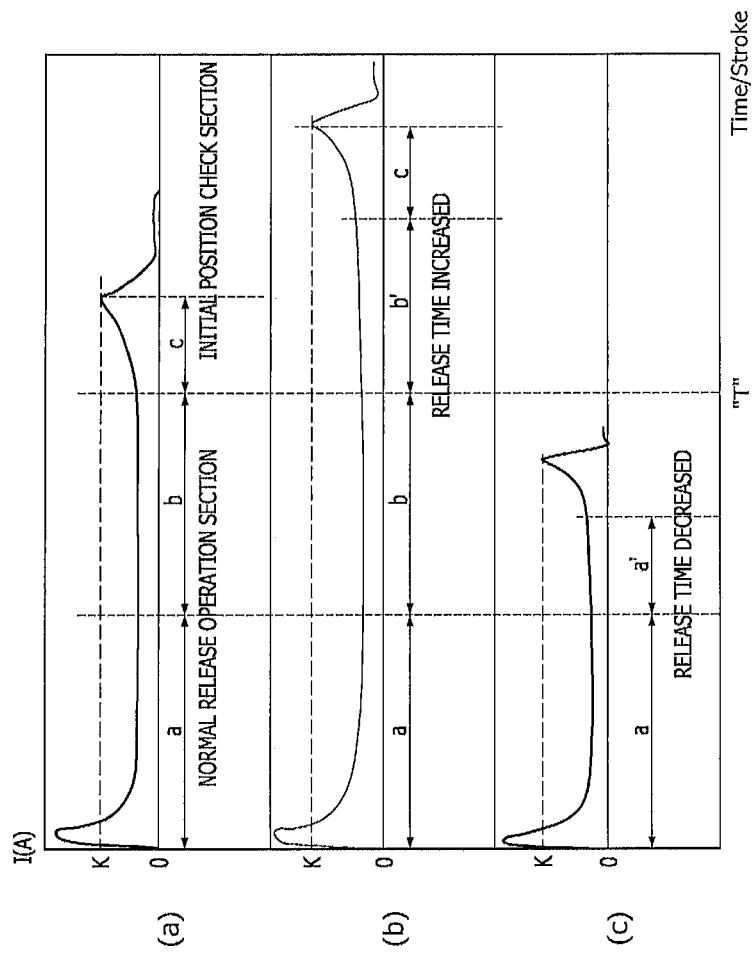
FIG. 4 shows graphs comparatively illustrating current changes when the eDIH parking brake is normally operated and when the eDIH parking brake has a fail, during a parking release operation of the eDIH parking brake in accordance with the present embodiment.

FIG. 4 shows graphs comparatively illustrating current changes when the eDIH parking brake is normally operated and when the eDIH parking brake has a fail, during a parking release operation of the eDIH parking brake in accordance with the present embodiment.

The eDIH parking brake may pull the piston by rotating the actuator (motor) in the reverse direction in order to reduce the pressurizing force of the shoe, during the parking release operation.

At this time, since the position of the motor cannot be known, the following control method may be performed to return the piston to the initial position.

For example, referring to (a) of FIG. 4, the section a is where the motor is driven in the reverse direction to release the pressurizing force, the section b is where the motor is rotated with no load until the piston reaches the torque plate, and the section c is where the current rises because the spring is recompressed after the piston reached the torque plate. At this time, the ECU may sense the current value. When the current value reaches a target current value K, the ECU may recognize the position of the motor as the initial position, and stop the rotation of the motor to check the initial position.

Therefore, when the eDIH parking brake system is normally operated, an operation time (a+b) may be required for releasing the operation condition. The ECU may check whether the current value rises to the target current value K in the current rise section c (initial position check section), while monitoring the release time.

At this time, when the operation time required for releasing the operation condition of the eDIH parking brake (the time required until the current applied to the motor starts to rise toward the target current value K) is (a+b+b') because a specific time b' is added as illustrated in (b) of FIG. 4, the ECU may recognize that the eDIH parking brake has a fail. Furthermore, when the operation time required for releasing the operation condition of the eDIH parking brake (the time required until the current applied to the motor starts to rise toward the target current value K) is (a+a') because the section b is shortened to a time a' shorter than the preset time b, the ECU may recognize that the eDIH parking brake has a fail.

FIG. 5 is a flowchart for describing a method for detecting a fail during the parking release operation of the eDIH parking brake in accordance with the present embodiment.

As illustrated in FIG. 5, the ECU (not illustrated) may detect the operation time required for releasing the operation condition of the eDIH parking brake (the time required until the current applied to the motor starts to rise toward the target current value K in FIG. 4), at step S201. When the detected operation time is increased to a larger value (a+b+b') than the reference time (a+b) as illustrated in (b) of FIG. 4 (Yes at step S202), the ECU may recognize that a fail occurred due to abrasion of a friction member, at step S203.

Therefore, the ECU may output an alarm (warning message) to a driver (for example, driver terminal) in response to the additional operation time b' of the increased operation time (a+b+b'), the alarm informing the driver that gap adjustment between the lining and the disk is required because the lining of the eDIH parking brake is worn, at step S206.

Furthermore, when the detected operation time is decreased to a smaller value (a+a') than the reference time (a+b) as illustrated in (c) of FIG. 4 (Yes at step S204), the ECU may recognize that an abnormal error unlike abrasion of the friction member occurred in the parts of the brake, at step S205.

Therefore, the ECU may output an alarm (warning message) to the driver (for example, driver terminal) in response to the insufficient operation time a' of the decreased operation time (a+a'), the alarm informing the driver that an abnormality occurred in the parts of the eDIH parking brake, at step S206.

In accordance with the present embodiment, when a mechanical problem occurred due to an overload or durability of the eDIH parking brake, for example, when the spring of the piston was damaged or lost its elasticity, the ECU can sense a shift of an inflection point and current value of the motor by the spring, recognize the shift as a fail, and output a warning message to a driver, there preventing an accident caused by a brake fail.

Furthermore, the ECU can sense a shift of an inflection point and current value of the motor by the spring in the piston without using a position sensor in the eDIH parking brake, and perform control. Therefore, the cost for the position sensor can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for detecting a fail of an electronic parking brake, comprising:
    detecting, by an electronic control unit (ECU), a current applied to a motor during a parking operation of an electronic parking brake, and detecting a current inflection point at which the slope of the current is changed, the slope of the current having started to rise in a load generation section following a no-load section after a starting current of the motor was generated;
    detecting, by the ECU, a time to reach the detected current inflection point;
    comparing the time to reach the detected current inflection point to a preset time to reach a preset reference current inflection point; and
    recognizing that a fail occurred during the parking operation of the electronic parking brake, when the time to reach the current inflection point is different by a preset error range or more from the time to reach the preset reference current inflection point,
    wherein when the time to reach the current inflection point is shorter than the time to reach the preset reference current inflection point, the ECU recognizes that a fail occurred during the parking operation of the electronic parking brake.

2. The method of claim 1, wherein the method further comprises comparing, by the ECU, a current value of the detected current inflection point to a current value of the preset reference current inflection point, and recognizing that a fail occurred during the parking operation of the electronic parking brake, wherein when the current value of the detected current inflection point is smaller than the current value of the preset reference current inflection point, the ECU recognizes that a fail occurred during the parking operation of the electronic parking brake.

3. The method of claim 1, wherein the method further comprises comparing, by the ECU, a current value of the detected current inflection point to a current value of the preset reference current inflection point, and recognizing that a fail occurred during the parking operation of the electronic parking brake, wherein the current value of the preset reference current inflection point is a current value when a current value of an actuator, generated during the parking operation of the electronic parking brake, corresponds to a compressive force of a spring.

4. The method of claim 1, wherein the time to reach the current inflection point indicates a time to reach the current inflection time at which the slope of the current is changed, the slope of the current having started to rise from the start point of the load generation section following the no-load section after the starting current of the motor was generated.

5. A method for detecting a fail of an electronic parking brake, comprising:
    detecting, by an ECU, an operation time required for releasing an operation condition of an electronic parking brake;
    recognizing, by the ECU, that a fail occurred in the electronic parking brake due to abrasion of a friction member, when the detected operation time is increased to a larger value than a preset reference time; and
    recognizing that a fail occurred in the electronic parking brake due to an error in parts of the electronic parking brake other than abrasion of the friction member, when the detected operation time is decreased to a smaller value than the preset reference time.

6. The method of claim 5, further comprising outputting, by the ECU, an alarm or warning message to a driver terminal in response to the increased operation time, the alarm or warning message informing a driver that gap adjustment between the lining and a disk is required because a lining of the electronic parking brake is worn, after recognizing that the fail occurred.

7. The method of claim 5, further comprising outputting, by the ECU, an alarm or warning message to a driver terminal in response to the decreased operation time, the alarm or warning message informing the driver that an abnormality occurred in the parts of the electronic parking brake, after recognizing that the fail occurred.

8. The method of claim 5, wherein the operation time indicates the time at which a current applied to a motor starts to rise toward a preset target current value.

9. The method of claim 5, wherein the operation time required for releasing the parking operation of the electronic parking brake corresponds to a time obtained by adding sections a and b of sections a, b and c, wherein the section a is where a motor of the electronic parking brake is driven in the reverse direction to release a pressurizing force, the section b is where the motor is rotated with no load until a piston of the electronic parking brake reaches a torque plate after the pressurizing force is released, and the section c is where the spring is recompressed after the piston reaches the torque plate, and the current rises to reach the reference current value.

10. An apparatus for detecting a fail of an electronic parking brake, comprising an ECU configured to detect a current applied to a motor during a parking operation of an electronic parking brake, and detect a current inflection point at which the slope of the current is changed, the slope of the current having started to rise in a load generation section following a no-load section after a starting current of the motor was generated,
    wherein the ECU is further configured to detect a time to reach the detected current inflection point, compare the time to reach the detected current inflection point to a preset time to reach a reference current inflection point, and recognize that a fail occurred during the parking operation of the electronic parking brake, when the time to reach the current inflection point is different by a preset error range or more from the time to reach the reference current inflection point,
    wherein when the time to reach the current inflection point is shorter than the time to reach the reference current inflection point, the ECU is configured to recognize that a fail occurred during the parking operation of the electronic parking brake.

* * * * *